C. F. WILLIAMS.
LATHE.
APPLICATION FILED AUG. 15, 1916.
1,239,857.
Patented Sept. 11, 1917.
2 SHEETS—SHEET 2.
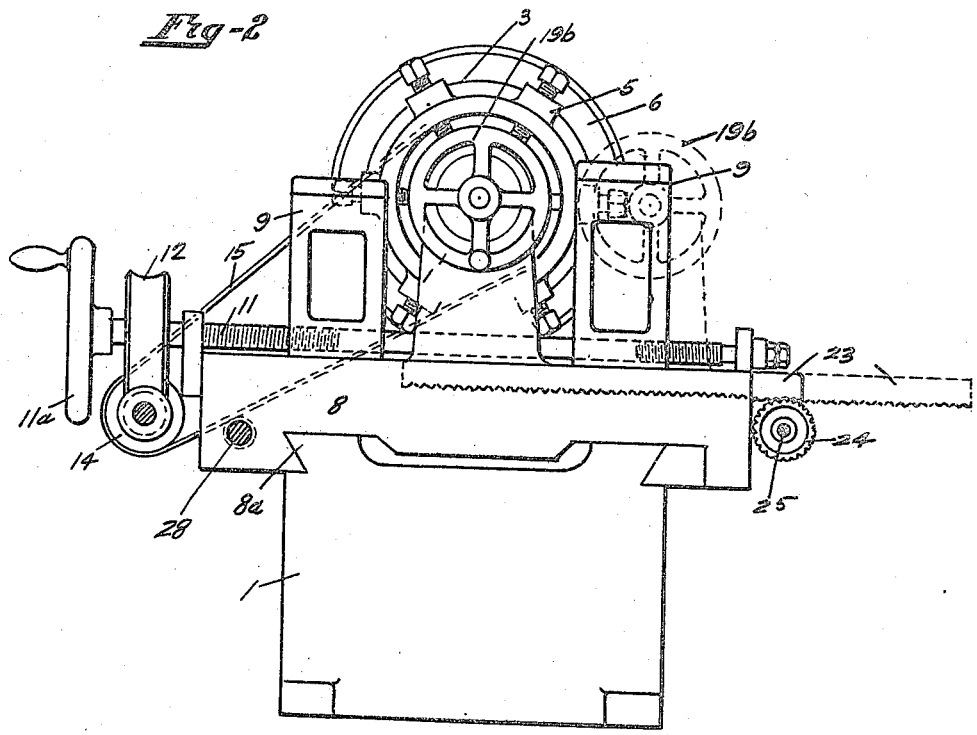
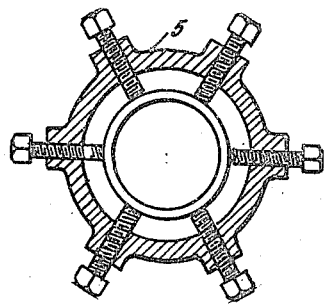

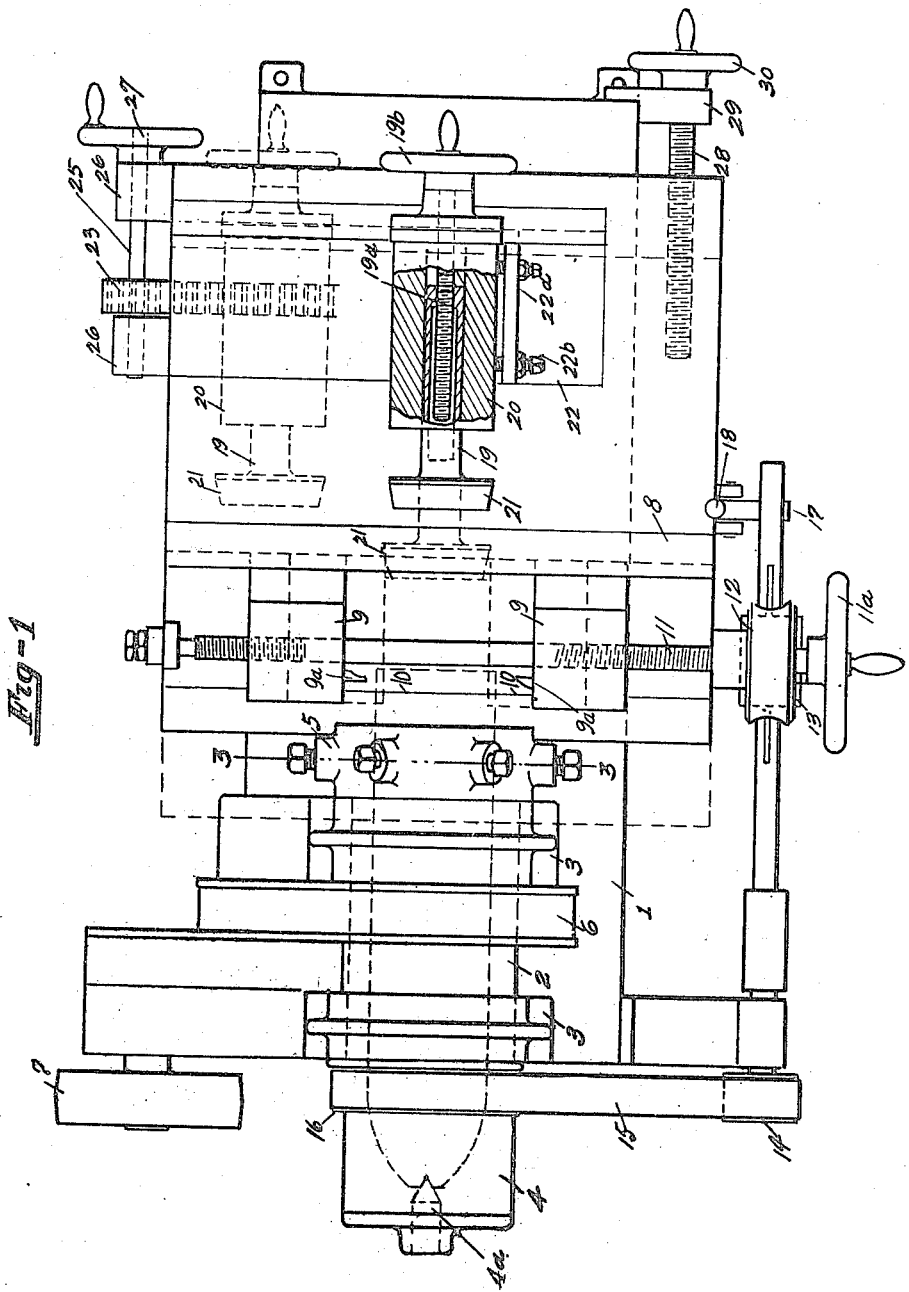

UNITED STATES PATENT OFFICE.

CHARLES F. WILLIAMS, OF ERIE, PENNSYLVANIA, ASSIGNOR TO WILLIAMS TOOL COMPANY, OF ERIE, PENNSYLVANIA, A CORPORATION OF PENNSYLVANIA.

LATHE.

1,239,857.  Specification of Letters Patent. Patented Sept. 11, 1917.

Application filed August 15, 1916. Serial No. 115,020.

*To all whom it may concern:*

Be it known that I, CHARLES F. WILLIAMS, a citizen of the United States, residing at Erie, in the county of Erie and State of Pennsylvania, have invented new and useful Improvements in Lathes, of which the following is a specification.

This invention relates to lathes and consists in certain improvements in the construction thereof as will be hereinafter fully described and pointed out in the claims.

More particularly the invention relates to that type of lathes commonly termed cut-off tools and it is particularly designed for cutting off hollow articles, such as the ends of shells.

The invention is illustrated in the accompanying drawings as follows:—

Figure 1 shows a plan view.

Fig. 2 an end elevation.

Fig. 3 a section on the line 3—3 in Fig. 1.

1 marks the base, 2 the head or hollow spindle, 3 bearings carried by the base in which the hollow spindle is journaled, 4 a centering end carried by the spindle, said centering end having a centering point $4^a$, 5 a chuck carried by the spindle which in the form shown simply consists of a head having a series of set screws, 6 the driving gear mounted on the spindle and which is driven through the usual gearing from the drive pulley 7. A tool carrier support 8 is mounted on the bed of the machine and tool carriers 9 are mounted on guides 10 arranged on the support 8, the guides extending laterally across the machine. Tools $9^a$ are mounted in the carriers and the carriers are operated by a screw spindle 11 having right and left screws operating the carriers toward and from the work. A worm gear 12 is mounted on the spindle 11 and this is engaged by a worm 13. The worm 13 is driven by a pulley 14 and the pulley 14 from a pulley 16 by means of a belt 15. The worm 13 may be kept in engagement with the worm gear 12 by a latch 17, the latch being operated by a lever 18. The carriers are, therefore, fed into the work by the action of the worm and gear and when the cutting off is completed the latch 17 is actuated dropping the worm out of engagement and the tools returned by a hand wheel $11^a$. These parts do not form in themselves the subject matter of my invention.

Heretofore it has been customary to place a hollow article, such as a shell, in the spindle and center it by means of the set screws 5. This requires considerable time and does not always result in accurate centering and especially when it is understood that it is necessary to force the end of the shell onto the centering point $4^a$. The ordinary tail screw will not permit of the insertion of the shell. In order to obviate these difficulties, I have provided the following mechanism:—

A tail block 20 carries a centering spindle 19. The centering spindle has a tapered centering plug 21. The centering plug may be moved axially to bring it into engagement with the work and to force the work onto the centering pin $4^a$ by means of the screw $19^a$ carried by the tail block 20, a hand wheel $19^b$ being provided for actuating the screw. The tail block is moved in the guides 22 extending laterally of the carriage 8. A stop rack $22^a$ is arranged on the support 8 above the guide 22 and adjustable screws $22^b$ are provided forming a stop positioning the tail block so as to center the spindle 19 with the spindle 2. A rack 23 is arranged below the tail block and engages a pinion 24 carried by the shaft 25. The shaft 25 is mounted in bearings 26 arranged in brackets extending from the carriage of the machine and a hand wheel 27 is provided for operating the shaft 25. It will be observed that the support 8 carries both the tail block and the tool carriers so that there is always the same relation between the end of the chuck and the centering device. The carriage 8 may be moved axially along the base by means of a screw 28, the screw being carried by a bracket 29 which is operated by a handle 30. The support 8 is mounted on the guides $8^a$ on the base.

In operating the machine, the set screws of the chuck 5 are backed off; the shell is inserted in the hollow spindle; the tail block is moved forward against the stop $22^b$; the centering spindle 19 is moved forward carrying the centering plug 21 into the end of the shell. The shell is then forced inwardly onto the centering pin $4^a$ and held in exactly central position with relation to the machine. The set screws and the chuck are then tightened up, one at a time, the spindle 2 being rotated bringing the set screws successively to the top and there set up. After the centering operation is completed, the centering spindle may be backed off and the tail block moved laterally so as to expose the end of the hollow spindle and thus permit the removal of the shell after the cutting-off operation is completed and the insertion of new work.

What I claim as new is:—

1. In a lathe, the combination of a hollow spindle; a tail block; a centering spindle carried by the tail block; means for moving the centering spindle axially to center the work; means for moving the tail block laterally to clear the opening of the hollow spindle and permit the insertion and removal of the work, and a chuck on the hollow spindle adapted to engage and clamp an inserted piece while centered by the centering spindle.

2. In a lathe, the combination of a hollow spindle; a tail block; a centering spindle carried by the tail block; means for moving the centering spindle axially to center the work; means for moving the tail block laterally to clear the opening of the hollow spindle and permit the insertion and removal of the work; a carrier for carrying the tool in position to operate upon the work; a chuck on the hollow spindle adapted to engage and clamp an inserted piece while centered by the centering spindle; and a movable support for the tool carrier and tail block.

3. In a lathe, the combination of a hollow spindle; a centering device at the rear end of the hollow spindle; a tail block; a centering spindle carried by the tail block; means for moving the centering spindle axially to center the work; means for moving the tail block laterally to clear the opening of the tail block and permit the insertion and removal of the work; and a chuck on the hollow spindle adapted to engage an inserted piece while centered by the centering spindle.

In testimony whereof I have hereunto set my hand.

CHARLES F. WILLIAMS.

Copies of this patent may be obtained for five cents each, by addressing the "Commissioner of Patents, Washington, D. C."